(12) United States Patent
Mohsenzadeh

(10) Patent No.: US 9,773,236 B2
(45) Date of Patent: Sep. 26, 2017

(54) SYSTEMS, DEVICES, AND METHODS FOR PROCESSING PAYMENTS FOR A CARD

(71) Applicant: Hossein Mohsenzadeh, Medford, MA (US)

(72) Inventor: Hossein Mohsenzadeh, Medford, MA (US)

(*) Notice: Subject to any disclaimer, the term of this patent is extended or adjusted under 35 U.S.C. 154(b) by 0 days.

(21) Appl. No.: 13/844,586

(22) Filed: Mar. 15, 2013

(65) Prior Publication Data

US 2014/0279525 A1    Sep. 18, 2014

(51) Int. Cl.
  *G06Q 20/22* (2012.01)
  *G06Q 20/40* (2012.01)
  *G06Q 20/34* (2012.01)
  *G06Q 20/24* (2012.01)

(52) U.S. Cl.
  CPC .......... *G06Q 20/223* (2013.01); *G06Q 20/24* (2013.01); *G06Q 20/34* (2013.01); *G06Q 20/409* (2013.01)

(58) Field of Classification Search
  CPC .................. G06Q 20/085; G06Q 20/357
  USPC ........................................... 705/44
  See application file for complete search history.

(56) References Cited

U.S. PATENT DOCUMENTS

| | | | |
|---|---|---|---|
| 8,423,467 B1* | 4/2013 | Johansson et al. | 705/44 |
| 2011/0320347 A1* | 12/2011 | Tumminaro et al. | 705/39 |
| 2012/0278235 A1* | 11/2012 | Kitchel | 705/44 |

* cited by examiner

*Primary Examiner* — Jessica Lemieux
(74) *Attorney, Agent, or Firm* — Parker Ibrahim & Berg LLC; Stephen D. LeBarron

(57) ABSTRACT

Embodiments of the disclosure include systems, methods, and devices for processing payments for a card. Such embodiments include receiving payment information from a payor at an intermediate entity server as well as authorizing the payment transaction, by the intermediate entity server, based on the payment information. Further such embodiments include providing instructions, by the intermediate entity, to debit a payor card account and credit payee shadow ledger account based on the payment information as well as providing instructions, by the intermediate entity, to debit the payee shadow ledger account and to credit the payee card account based on payment rules.

31 Claims, 6 Drawing Sheets

211

SYSTEMS, DEVICES, AND METHODS FOR PROCESSING PAYMENTS FOR A CARD

BACKGROUND

Millions of credit, debit and prepaid cards have been issued to consumers, large and small businesses. Today, most cards primary utility is to pay for goods or services by the card holder on line by providing required information on a web site and the like (Card Not Present) or by swiping a card at a point-of-sale (POS) device or through a Near Field Communication (NFC) device and the like (Card Present). Conversely the merchant (Biller, e-commerce site, a store; or the like) when accepting a card provides facilities such as a POS device, a secure and encrypted website that is capable of accepting payment, etc. Traditional business owners or individuals who are paid by customers for goods or services rendered have an increasing desire to accept payment from customer credit, debit cards, or electronic checks, and accepting such payments online or through mobile devices as well as from point-of-sale (POS) terminals. Accepting payments from credit and debit cards (as well as electronic checks) allows a business owner or individual to sell goods and services to a large market and improve cash flow, and provides buyers (e.g. customers) of those goods and services a secure, convenient, and efficient way to make payments.

Businesses owners who would like to accept electronic payments typically have two concerns. First, business owners have to establish a merchant account that allows the business owner to accept payments from customer credit and debit cards or electronic checks. Second, business owners have to connect the merchant account to their website or mobile application so that if a customer makes a credit, debit card or electronic check payments using the business' website or mobile application, the payment is processed by debiting the payor (e.g. customer) account and depositing the payment to the payee (e.g. business') account.

Conventional credit card or debit card transactions between a business and a customer involve up to four additional parties. A first party is a payment network such as Visa®, Mastercard®, American Express®, STAR® etc. that processes and settles payments between multiple different business and customers. A second party is a card issuer which is typically a financial institution that is a member of at least one payment network. Such a financial institution issues the card (e.g. credit or debit) for a government entity, consumer or a business. The third and fourth parties are a financial institution member of a specific network sponsor and a merchant processor and its agents. Together they perform the role of an acquirer. That is, an acquirer is one or more entities the accepts and processes card payments. Thus, a sponsor may be a financial institution that is a member of at least one payment network which sponsors a merchant processor to use the payment network and is financially responsible in case of loss or default (with respect to accepted card payments) to the payment network on behalf of the organization it sponsors The reason for such sponsorship is because payment networks only accept a financial institution to be their members so that can be financially responsible for the card payments. A merchant processor has a contractual relationship with each individual business, has and provides electronic transaction processing capability to process the card payment transactions for that business. In some cases a financial institution entity may assume the roles of an issuer, acquirer, sponsor and a merchant processor or a combination thereof such as JP Morgan Chase or US Bank presently. Some networks such as American Express have predominantly only two parties: (1) the payment network which performs the role of both an issuer and acquirer; and (2) a merchant processor and its agents. American Express, traditionally did not have financial institution issuing its cards, although recently it is changing its business practices such that it is allowing financial institution issuers to participate in its network.

The costs associated with establishing a merchant account and taking online card payments can be significant for a business owner. For example, most merchant acquirers or their affiliates charge an application fee and a monthly fee for a merchant account, and further take a percentage of each payment processed. Further, many small business owners are not able to obtain a merchant account with an acquirer (i.e. sponsor and merchant processor) because many business owners do not meet acquirer requirements of having sufficient operating capital to cover any losses that might happen due to fraud, chargebacks, refunds and other risks. The efforts associated with taking online payments are also significant for business owners. Industry regulations require that parties who are involved in capturing, storing, or processing card transactions adhere to security rules which includes Payment Card Industry (PCI) standards. Many small business owners do not have the knowledge, skills or the resources to generate and operate a website where customers can make card payments that comply with such security standards.

An alternative to establishing a merchant account with a financial institution and linking it to a website is to establish an account with an alternative service provider such as PayPal or Google Checkout. These alternative service providers act as agents of the merchant processors in most cases and offer small business owners a way to generate a website where they can sell goods and services and receive card payments, combined with a payment processing service that does not require the business to obtain its own merchant account from an acquirer (i.e. sponsor and merchant processor). Instead, the alternative service provider works with an existing acquire as its agent to accept card payments from a customer to a general merchant account in most cases although not always The benefit of using an alternative service provider is a business does not have to obtain a merchant account from an acquirer. However, the disadvantages of using an alternative service provider include high processing fees and that the merchants do not receive funds in a timely manner. Instead, the merchant has to wait for the alternative service provider to transfer funds from the provider's merchant account to a merchant's bank account, and may have to wait up to several days before they have access to the funds.

BRIEF SUMMARY

The embodiments of the present disclosure include of a system that allows a business cardholder to use existing credit or debit card account to accept card and other payments (e.g. electronic checks) from customers. In one embodiment, the system deposits payments accepted from customers by the acquirer (i.e. sponsor and merchant processor) into the business credit card or debit account such that the business owner can recycle such funds received with its coupled business card account. In such an embodiment it is not necessary to set up a merchant account (used in the conventional manner to accept customer card payments) as long as the business credit or debit card account is enabled to receive customer card payments. Alternate embodiments include an intermediate entity server accepting card payments from customers on behalf of a business using a card account as a merchant account. The intermediate entity server processes the payments and tracks the payments associated with the funds received using an internal shadow ledger account. Further, the intermediate entity may then remit funds to the business card account based on payment rules arranged a priori. The intermediate entity may be called a facilitator and perform a subset of functions of a merchant processor as well as link to a card issuer when remitting funds to the business card account. In other embodiments, a financial institution may perform functions of a facilitator and processor (and sponsor) such that the financial institution is the acquirer and accepts customer card payments on behalf of a business and remits the payments to a business card account. An electronic check is processed by an Automatic Clearing House and may also be called an ACH payment.

Further embodiments of the present disclosure enable currently used business card accounts (credit, prepaid, debit) that were only used for purchasing good and services to now have a feature to be used accept customer card payments. Such a feature is enabled by coupling the payment acceptance of customer cards to the traditional business card functionality through a facilitator that tracks payment and implements functions based on network rules, card issuer requirements, or business card holder preference to remit payments to the business card account.

Embodiments provide several advantages to a card issuer. For example, credit card issuers have a preference to charge interest for revolving credit card balances. When a cardholder uses a card for purchasing goods or services throughout a month, a card issuer system tracks purchase transactions to a ledger that it maintains for the card account. At the end of a billing cycle, which can be any day in a calendar month, the card issuer system generates an invoice for the total amount of purchases that the cardholder has accumulated throughout the billing cycle and sends the invoice electronically or through the postal service to the cardholder. The invoice includes a date due and a minimum balance due as well as the total balance due. If the cardholder decides to pay any amount below the full amount due at or before the date due, the card issuer applies an interest charge to the outstanding balance and provide (bill) that amount to the cardholder in the next billing cycle invoice. Card issuers typically generate a larger share of their overall revenue from charging interest rather than interchange fee (fee paid by the acquirer to issuer). Card issuers do not want to reduce such an income stream, and would prefer not to commingle the payment that the cardholder is potentially receiving from its customer with the amounts that are due on its internal card management systems which include customers card account ledger. Further, issuers do not want a positive balance on their customer credit card accounts. In some cases card issuers disperse a check if a customer card account has a positive balance at the end of one or multiple consecutive billing cycles. However, embodiments of the present disclosure enable a cardholders to have a running balance on a shadow ledger account managed by a alternate whatever processor and does not affect the card issuer's internal card management systems cardholder ledger balance. Embodiments include a system designed to remit funds, automatically or manually, to cardholder accounts based on preferences or rules of the payment network, issuer or the cardholder Such a system enables card payments that a business cardholder receives from its customers to be reused for purchases by the business when the business pays for goods and services using the card account enabling the card issuer to earn additional transactional revenue from interchange when the card is used from fund received. This is distinct from the conventional paradigm of a business receiving payments from customer in the form of a check or online bank account transfer. In such receipts of customer payment, the business deposits the payment in a bank account. Further, the business uses a card account for certain business expenses and purchases. However, only a portion of the funds received and deposited in the bank account are used in paying for the expenses and purchases made using the business card account. Other portions of the funds received from customer and deposited into a business account are used to pay vendors and other office materials by check or cash.

The advantages of embodiments of the present disclosure include providing an issuer of a card account for a business to receive more processing fees due to having customer payments received by a business to be credited to a business card account (credit, debit, prepaid) instead of a business bank account. Thus, the business can use all the funds received from customer payments for future purchases to be made by the business card account thereby allowing the issuer of the business card account to incur an increased fee income In addition, the Durbin amendment was passed by the Congress as part of Dodd-Frank Wall Street Reform and Consumer Protection Act (Pub.L. 111-203, H.R. 4173) recently regulating the debit interchange for large financial institutions (with assets above $10B in assets) can only receive 21 cents plus 1 cent adjustment for fraud rather than 1.65% of the transaction Amount+15 cents for card not present transaction on the Visa network; for small institutions (with assets below $10 B). This has significantly reduced revenue potential for the larger institutions. For example for a $100 transaction, prior to the passage of Durbin amendment the large institutions and currently the small institution received $1.80 in interchange revenue, whereas the large institution will only receive a fixed $0.22 in interchange revenue after the passage of the amendment. Debit card transaction revenue comprised a large portion of most financial institutions' income from bank accounts (Demand Deposit Accounts (DDA)) that they setup for business and consumers. Therefore the limitation imposed by this regulation significantly reduced the overall revenues that each business account generate for the issuing financial institution. Embodiments of the present disclosure allows the large financial institution to issue credit cards to its business customers in place of debit cards attached to DDA accounts that are prevalent presently and shift businesses to utilize their credit card account in place of their regular bank account. In such an embodiment the financial institution links the accounts receivable function of a business to the accounts payable function through the use of the credit card account enabling the financial institution to generate additional revenues from the use of the credit card in place of debit cards for its business customers through interchange.

For example a MasterCard Standard Core Value business Credit and Debit cards earn an interchange of 2.95% of the transaction amount+10 cents for an issuer. On the other hand, for a small business, a merchant acquiring standard pricing may be a 2.50% of the transaction amount+0.10 cents. The average interchange for such merchant might be around 2 percent of the transaction amount+10 cents. In embodiments of the present disclosure coupling for a business card has been implemented to accepts customer card payments and the cardholder has accepted terms and conditions that business card account can accept customer card payments, a card issuer may offer the interchange at its cost (i.e. 2% of transaction cost +10 cents) as long as the cardholder uses the funds received for purchasing goods and services with such business card account. This can be accomplished because the card issuer will generate 2.95% from the funds that the business receives from its customer card and are recycled Such a feature are analogous to rewards such as airline miles and reward points that the card issuer offers its cardholders. Rather than air miles for example the cardholder is offered rewards in the form of reduced interchange processing rate by the issuer.

In addition, large organizations have the ability to obtain purchasing card accounts or corporate card accounts and the like from a card issuer. A large organization that employs multiple workers may have multiple cards that are linked to the same aggregated business card account from by the issuer where at the end of the month the issuer send a statement to business outlining the total amount due with a breakdown of all its employee card spends. Such a business card account maybe settled by the large organization on a pre-agreed payment cycle. Embodiments of the present disclosure may be used in such a large organization setting such that acquiring activities of the large organization (acceptance of its customer card payments) is coupled to its aggregated business card account (linked to multiple cards, each held by an employee) as described in the present disclosure such that the large organization potentially may receive lower interchange or other incentives for coupling its card as described in present disclosure.

The foregoing summary is illustrative only and is not intended to be in any way limiting. In addition to the illustrative aspects, embodiments, and features described above, further aspects, embodiments, and features will become apparent by reference to the drawings and the following detailed description

BRIEF DESCRIPTION OF THE SEVERAL VIEWS OF THE DRAWINGS

The accompanying drawings, which are incorporated in and constitute part of this specification, illustrate embodiments of the invention and together with the description serve to explain the principles of the present disclosure. The embodiments illustrated herein are presently preferred, it being understood, however, that the invention is not limited to the precise arrangements and instrumentalities shown, wherein.

DETAILED DESCRIPTION OF THE INVENTION

Figure 1A:
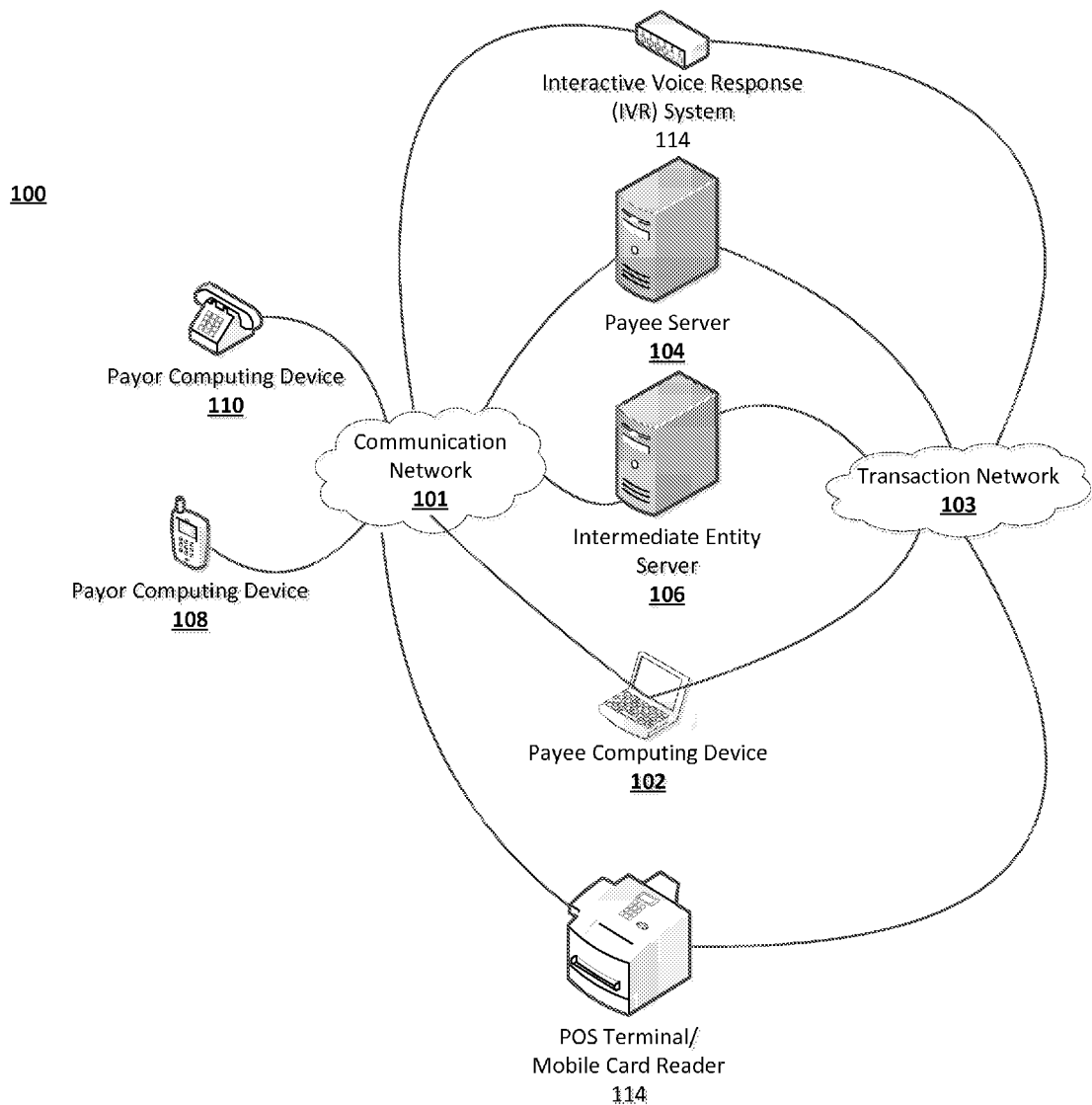
FIG. 1A is an exemplary system for accepting payor card payments and processing and crediting the card payments to a payee card account.

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms. Further, any software application, components, or function disclosed in the present disclosure may be incorporated in modules as described herein.

Embodiments of the present disclosure include systems, devices, and methods for processing a card payment transaction for a cardholder. Embodiments include allowing a card (e.g. credit, debit, prepaid) account to be used as a merchant account to accept card (e.g. credit, debit) payments from customers (as well as other payments such as electronic check). Thus, the role of the issuer of business card account is linked with the role of an acquirer (i.e. sponsor and merchant processor), or its agent that accepts customer card payments on behalf of the business owner. Although embodiments may be implemented by a financial institution acting as an issuer and an acquirer, other embodiments may have an intermediate entity link the issuer and acquirer roles and manage the transaction processing. That is, the intermediate entity not only facilitates payment acceptance and processing of customer card payments but also crediting the card accounts at the issuer according to stored rules in in the server, cardholder preferences and received customer payments. Further embodiments may include that the acquirer role is not performed by a combination of a sponsor and merchant processor but by the card issuing financial institution. Further embodiments may include that the issuer role is performed by the acquirer financial institution.

Embodiments include enabling a card account having a feature for being used as a merchant account to accept customer payments. Such a feature may be enabled when the card is first issued by an issuer to the business. In another embodiment, a business may have an existing (already issued) card account. The card issuer may allow the cardholder to enable the feature (under certain terms and conditions) for accepting customer payments using the card account. Once the such a feature is enabled, the issuer may send an intermediate entity such business card account information (card number, account information, business name, cardholder name, etc.) that is necessary to accept customer payments on behalf the business. The account for the cardholder may be used by any entity such as a business, government entity, non-profit organizations and individuals who would like or receive card payments, ACH payments and the like from others. Moreover, the cardholder may be a payee in embodiments of the disclosure. Further, although many of the embodiments discuss accepting card payments using a cardholder account, alternate embodiments may accept ACH payments and the like using a cardholder account.

Embodiments include enrolling one or more businesses (or entity) in a system hosted by an intermediate entity server that allows the intermediate entity to accept, on behalf of a cardholder, card payments (e.g. credit, debit, etc.) from one or more customers for goods and services rendered. The functions of the intermediate entity may be a financial institution or a third party facilitator. Moreover, the intermediate entity may not establish a traditional merchant account for the business to accept card payments from its customers. Instead, the intermediate entity uses an already established or existing (or recently issued) card account provided by an issuer (e.g. credit, debit, prepaid etc.) for the business (i.e. entity) to accept card payments from its customers. However, issuers may have only certain card accounts that are eligible to be used to accept customer card payments. As described in the present disclosure, the issuer may enter into certain terms and conditions with the cardholder to enable such feature for the card account including a business card account.

Further embodiments provide the business (or entity) to send a payment request (e.g. bill, electronic invoice, etc.) to each customer. In addition, the customer may render a card (e.g. credit, debit, pre-paid etc.) payment in response to receiving the payment request. The intermediate entity receives the card payment from the customer along with business identification and provides instructions to debit the customer card account and credit the business card account to corresponding financial institutions.

FIG. 1A is an exemplary system 100 for accepting payor (e.g. customer) card payments and processing and crediting the card payments to a payee (e.g. business) card account. Such a system 100 includes a payee computing device 102, coupled to a payee server 104 and an intermediate entity server 106 over a communication network 101 such as the Internet or wireless network (e.g. cellular and/or Wi-Fi). Further, a payor computing device 108 may be coupled to the payee server 104 and intermediate entity server 106 over the communication network 101. In addition, another payor computing device 110 such as a landline or mobile telephone may be connected to an interactive voice response (IVR) system 112 over the communication network 101. The IVR system 112 may also be coupled to the intermediate entity server 106 and the payee server 104 over the communication network 101. further the system 100 may include a point-of-sale terminal 114 equipped with a magnetic stripe reader or near field communication (NFC) reader to accept customer card payments. In other embodiment, the POS terminal 114 may be a mobile card reader equipped with a magnetic stripe reader or a Near Filed Communication (NFC) reader.

Moreover, the payee computing device (client) 102, payee computer server 104, POS terminal/mobile card reader 114 and IVR system 112 may coupled to the intermediate entity server 106 through a transaction network 103. Such a transaction network 103 may be secure tunnel across another communication network (known in the art). Further, the transaction network 103 may carry payment transaction information or other information pertaining to the intermediate entity server 106 in accepting card customer card payments on behalf of the payee from the payee computing device (client) 102, payee computer server 104, POS terminal/mobile card reader 114 and IVR system 112. Further, the payee computing device 102 may request payment information from the intermediate entity server 106 across the transaction network 103. In such embodiment described in the present disclosure, the payee may be any entity that includes a business, individual, government entity, and non-profit organization that would like to accept card payments or ACH payments and the like using a payee card account.

Embodiments of the present disclosure include the intermediate entity server 106 hosting a website for the merchant (e.g. payee) to receive card payments from its customer (e.g. payors). In another embodiment, the payee server 104 may host website for receiving card payments from its payors. In such an embodiment, the payee server 104 forwards the payor card payment information to the intermediate entity server 106 for processing the customer card payment. In a further embodiment the payee server 104 or the intermediate entity server 106 provides a mobile application to a payor to render card payments from a payor computing device 108 such as a mobile device (e.g. mobile phone, smartphone, tablet computer, etc.). In a further embodiment, the payee server 104 or the intermediate entity server 106 accepts customer card payments from a POS terminal/mobile card reader 114. In an additional embodiment, the payee server 104 or intermediate entity server 106 may provide the ability for a payor to render card payment using a text messaging application on a payor computing device 108. In an alternate embodiment, a payor may use a payor computing device 110 such as a landline telephone that communicates with an IVR system 112. The payor may interact with the IVR system 112 to provide payor card information (e.g. card account number, expiration date, security code, customer address information, etc.) to render customer card payments. Such embodiments, the payee server and/or IVR system 112 may forward such payor card information to the intermediate entity server 106 for processing the payor card payment. Thereafter, the intermediate entity server may credit the business card account based on payment rules arranged with the business a priori. Thus, in such embodiments the intermediate entity server 106 links the acceptance of customer card payments with crediting a payee card account based on such customer card payments.

Moreover, the intermediate entity uses the payee card account as a merchant account to accept customer card payments. That is, any funds received from customer card payments are credited to the payee card account based on payment rules arranged with the payee a priori. Thus, the intermediate entity works with the issuer of the payee card account to provide crediting information to the issuer for the payee card account based on customer card payments received on behalf of the payee. Hence, the intermediate entity links the role of acquirer (to accept customer card payments on behalf of the payee) to that of an issuer (the financial institution that issues the payee card account). In some embodiments, a financial institution acting as an acquirer or issuer may perform the functions of the intermediate entity as discussed and described in the present disclosure. Further, the intermediate entity further manages the fund flows based on rules and/or preferences imposed by a payment network(s), card issuer and the payee cardholder.

Other embodiments allow the payee to use a payee computing device 102 (e.g. computer server, mobile phone, smartphone, tablet computer, laptop computer, notebook computer, desktop computer, etc.) to send a payment request (e.g. bill, electronic invoice, etc.) to the payor. In addition, the payor may access payment information using the payor computing device 108 (e.g. mobile phone, smartphone, tablet computer, laptop computer, notebook computer, desktop computer, etc.). Such payment information may include reviewing outstanding invoices from the merchant, billing and payment history and other account and payment information. Further, the payee may access payment information that includes reviewing the balance of the business card account (used as a merchant account) for receiving card payments from one or more payors. The payee may also review outstanding invoices, billing and payment history and other account and payment information associated with one or more payors. Further, the payee may request to refund a card payment rendered by the payor after determining an overpayment or a refund is necessary for goods purchased and/or services performed.

Figure 1B:
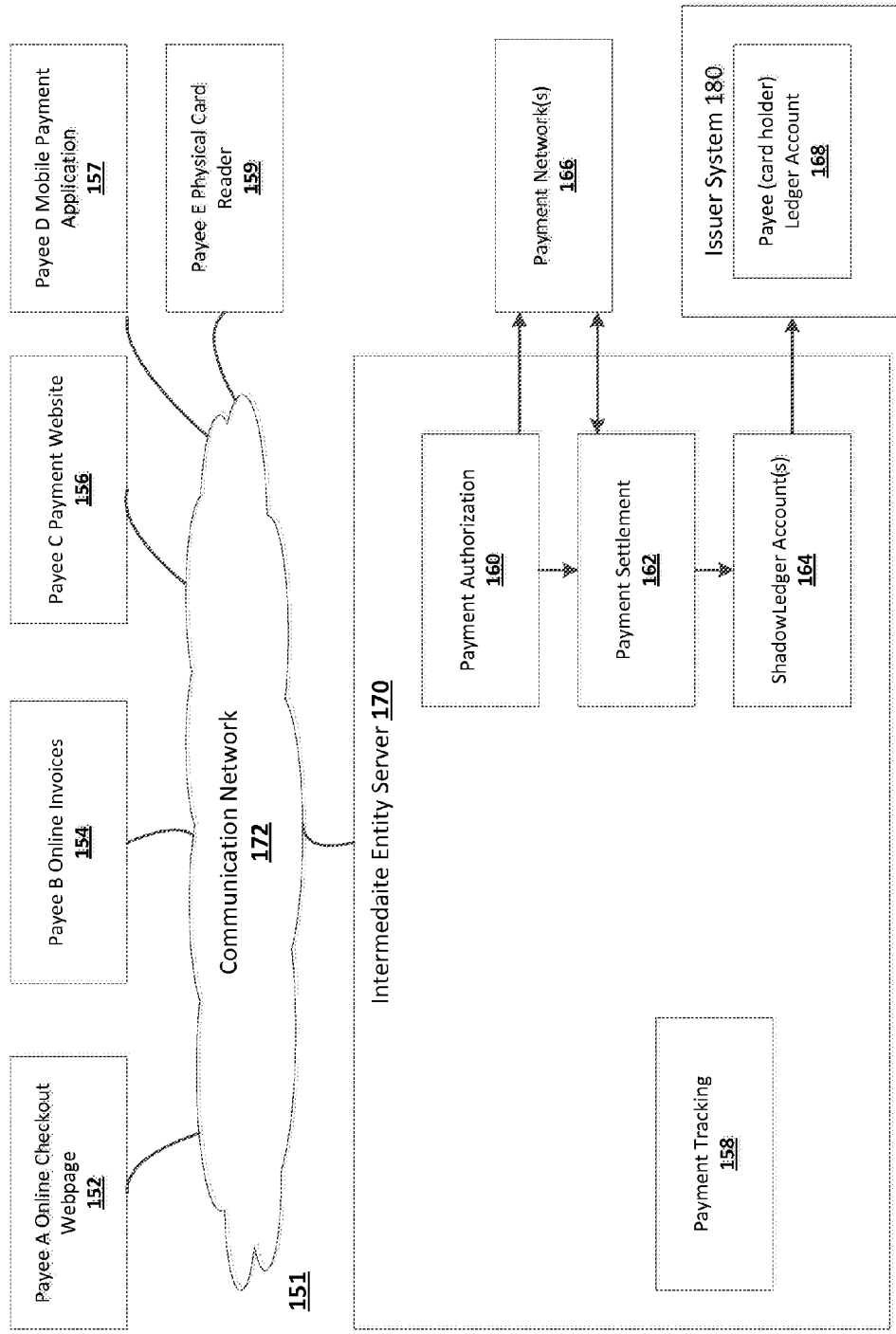
FIG. 1B is an exemplary block diagram of a system for accepting payor card payments and processing and crediting the card payments to a payee card account.

FIG. 1B is an exemplary block diagram of a system 151 for receiving payor card payments and processing and crediting the card payments to a payee card account. The exemplary system 151 illustrates an intermediate entity server 170 interacting with several functional and structural components from different payees (e.g. business/merchants) over a communication network 172 that include a payee online checkout webpage 152 hosted by a payee server or another intermediate entity server, a payee's request to process online invoices 154 from a payee computing device, a payee payment website hosted by the payee server or another intermediate entity server, a payee mobile payment application (module) 157 hosted by a payee server or another intermediate entity server, and a physical card reader 159 of a point-of-sale (POS) terminal (equipped with magnetic stripe reader and/or NFC reader). Each of the payee functional and structural components (152, 154, 156, 157, 159) provides payor card information and payee card account information to the intermediate entity server 170. A payment tracking function 158 (e.g. software application and/or hardware module) records the payment transaction to be processed between each payee (business) and its payor (customer). Further, the intermediate entity server may establish a shadow ledger account 164 for each payee. For each card payment transaction accepted from each payor, the intermediate entity has a payment authorization function 160 (e.g. software application and/or hardware module) that interacts with a payment network 166 to verify, for example, the identity of the payor and whether the payor has sufficient funds in its card account to render payment for the transaction.

A further embodiment herein discloses that the payee provides online invoices 154 to be processed by the intermediate entity server 170. Such online invoices 154 may be forwarded or accessed by a payor such that the payee and in turn the intermediate entity server may accept card payments from a payor for the online invoices through the payee online checkout webpage 152, a payee payment website 156, a payee mobile payment application (module) 157 and a physical card reader 159 of a point-of-sale (POS) terminal. Further, the online invoices 154 can include payor card account information and payee identification information. The payee may submit online invoices on a website hosted and operated by the intermediate entity.

An additional embodiment herein discloses that the payee provides a payment website 156 to accept card payments from a payor that can be hosted by the intermediate entity server or a payee server. Further, the payor may access such a payment website 156 to render a card payment to the payee. Such card payment transaction are received by the payment website 156 and forwarded to the intermediate entity server 170 to be processed.

An alternate embodiment herein discloses that the payee offers a mobile payment application 157 to accept card payments from a payor. The mobile payment application or wireless access protocol (WAP) site can be hosted by the intermediate entity server or a payee server. Further, the payor may access such WAP site and download the payee mobile payment module 157 to render future card payments to the payee. Such mobile payment transaction are received by the WAP site and forwarded to the intermediate entity server 170 to be processed. A WAP site maybe considered a rendered HTML page provided by a server for a defined screen size.

The intermediate entity server 170 may have several card payment transactions to process each day and may settle such transactions in batches once or multiple times per day or continuously using a payment settlement function 162 interacting with the payment networks 166. Consequently, the intermediate entity server 170 provides instructions to the payor card issuer to debit the payor card account through the payment processing network 166 such as VISA®, MasterCard®, Maestro®, STAR®. When the payment is settled, the intermediate entity server 170 credits the shadow ledger account 164 for the payee. Based on payee rules set up by the card issuer, the processor, intermediate entity or arranged with the business a priori, the intermediate entity server 170 provides instructions to debit the shadow ledger account 164 and credit the payee (card holder) card account 168 managed by an issuer computer system 180. As described in the present disclosure, the functions of the intermediate entity server may be implemented by an issuer or an acquirer. Example payment rules may include the intermediate entity server retaining a percentage of payment for each transaction pursuant to an agreement between the intermediate entity and the payee, the issuer and other interested parties or provide instruction for credit entry, at the due date of the payee card statement balance due or another date selected by one of the parties, or make a payment to the payee card account every time a customer card payment is received. In providing instructions to credit the payee card account 168, the intermediate entity server 170 interacts with the issuer of the payor card account. (This is done directly through real time links with the card issuer ledger account 168 or through batch process or based on aggregator bill payment services, such as MasterCard RPPS and the like. In such embodiments, a credit is applied per rules setup on the rules engine per terms when enabling the payee card account to accept customer card payments. Thus, the intermediate entity 170 links capability of accepting customer card payments with crediting a payee card account based on the customer card payments. Alternative embodiments include the intermediate entity accepting ACH payments instead from a payor on behalf of the payee using the payee card account. Such ACH payments are typically settled in batched format through interchanging files.

Additional embodiments may include receiving instructions that includes an input amount, at the intermediate entity server, from a payee computing device to transfer the input amount from a payee shadow ledger account to the payee card account. Further, the intermediate entity server may provide instructions to transfer input amount from the payee shadow ledger account to the payee card account. Another embodiment may be called a "cash out" embodiment that includes receiving instructions, at the intermediate entity server, from a payee computing device, the instruction include a request to transfer funds from the payee shadow ledger account to an external account at for example another financial institution or a payees bank account at the issuer. Further, the intermediate entity server may provide instructions to debit the payee shadow ledger account and credit the payee external account using ACH, credit card, EFT, and debit card networks. Moreover, the payee external account may be a bank account, a credit card, or prepaid card account.

Figure 2A:
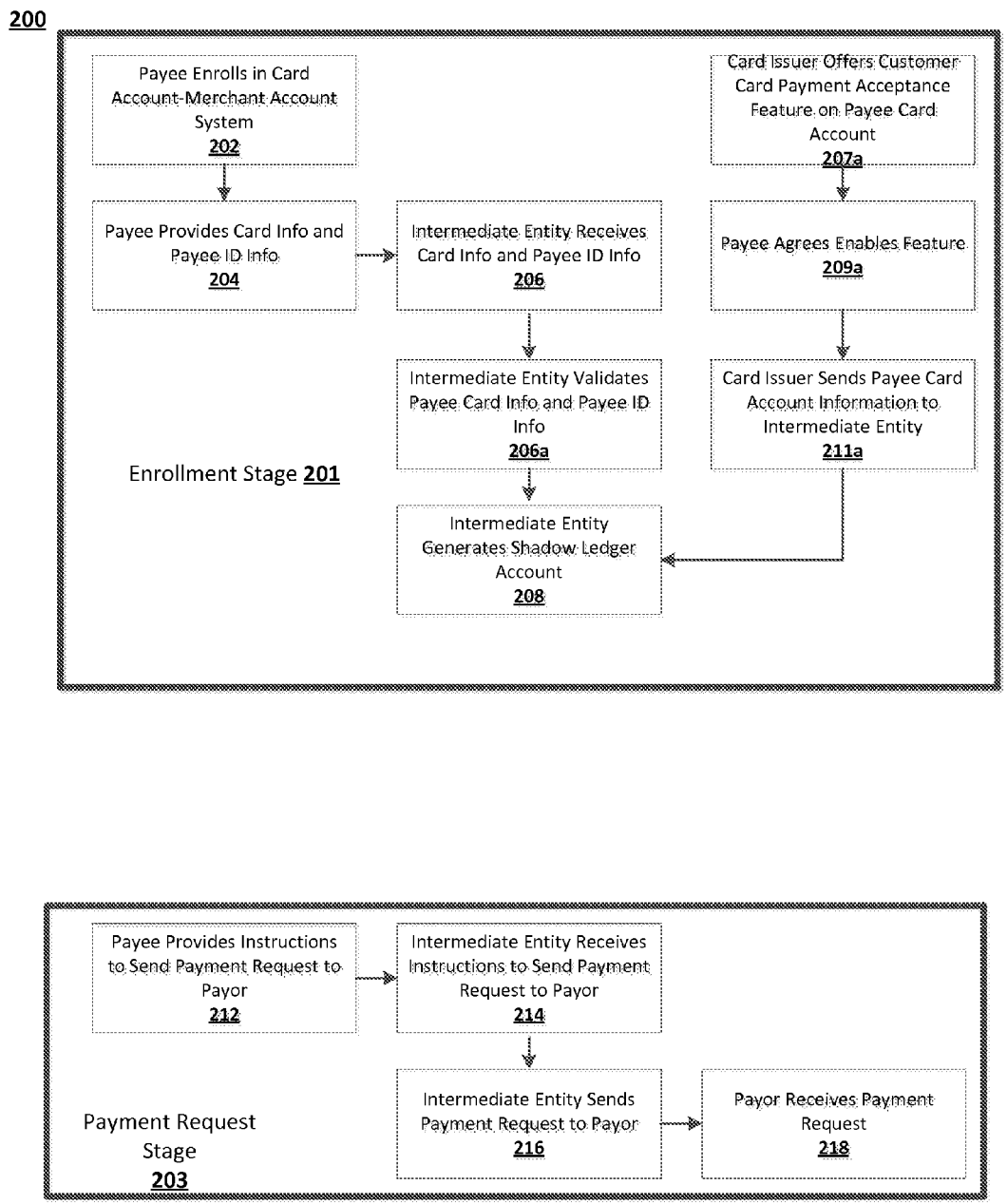
FIGS. 2A-2C are exemplary flowcharts of example methods for accepting payor card payments and processing and crediting the card payments to a payee card account.
Figure 2B:
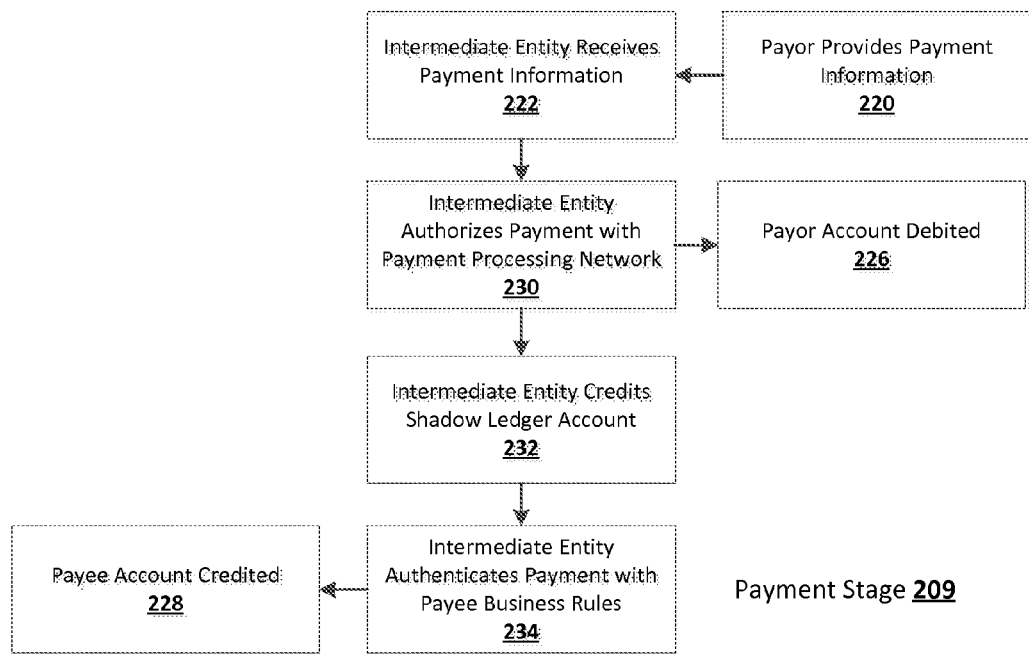
Figure 2C:
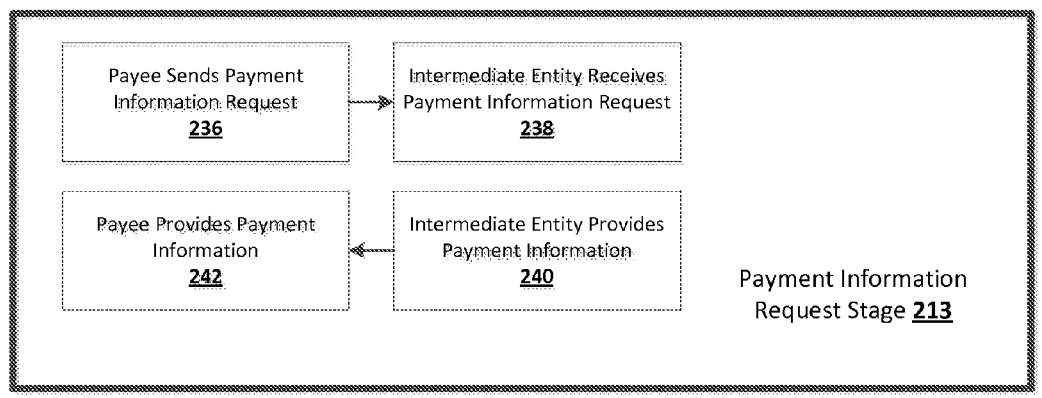
Figure 2C:
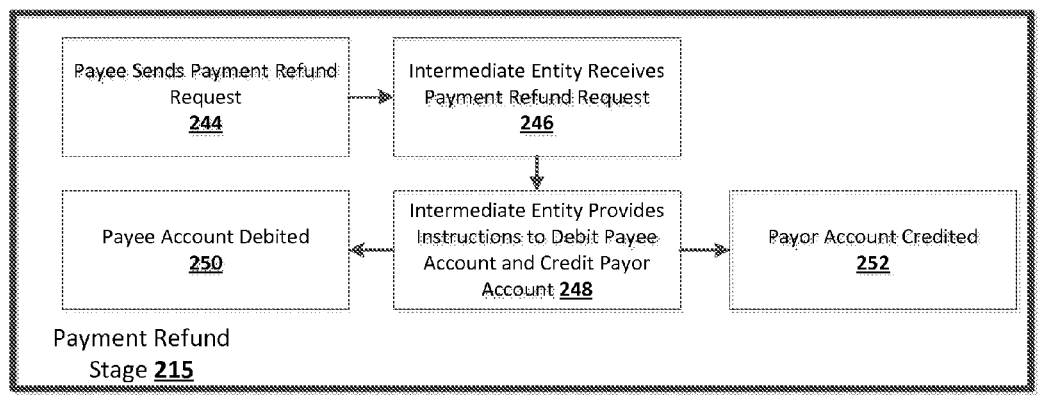

FIGS. 2A-2C are exemplary flowcharts of example methods for accepting payor card payments and processing and crediting the card payments to a payee card account. The example methods may be implemented by a payee computing device, a payor computing device, and an intermediate entity server interacting with each other. Further, the example methods may be described to include an enrollment stage 201, a payment request stage 203, a payment stage 209, a payment information request stage 213, and a payment refund stage 215. The functions discussed in describing the example methods shown in FIGS. 2A-2C are implemented by one or more software applications and/or hardware components comprising "modules" as described in the present disclosure.

Referring to the FIG. 2A, example methods of enrolling 201 in a system a card (e.g. credit card, debit card, pre paid card, stored value card and the like) to accept a payment (card, electronic check, ACH and the like) from a payor (e.g. customer). An issuer may have such a feature available for certain cards. Thus, during the enrollment stage, the cardholder and the issuer agree on certain terms and conditions including payment rules such that the business card account may be used a merchant account to accept customer card payments. The example method 201 includes a payee accessing a website, for example, (but also can be enrolled via telephone call, postal mail or in person at, a financial institution branch, etc.) associated with the intermediate entity or the issuer and accepting terms and condition to accept payment 202 using the payee card account. Further, the method includes the payee providing payee card account information as well as payee identification information, using a payee computing device, for a payee card account that will be used to accept customer card payments by the intermediate entity server on behalf of the payee, as shown in block 204. The payee card account may include but is not limited to, a credit card account, a debit card account, or a prepaid card account. The payee card account information includes a payee card number or a subset thereof, payee card expiration date, payee card security code, payee card account or a combination thereof. The payee identification information may include payee name, payee address, payee telephone number, payee email address, or a combination thereof. In addition, the method includes the intermediate entity server receiving payee card information and payee identification information, as shown in block 206. Moreover, the method includes the intermediate entity server validating the payee card account information and the payee information, as shown in block 206*a*. This validation includes verifying the payee card account information with a card issuing financial institution that includes whether the card account is eligible to have a payment acceptance capability to accept customer card payments as well verifying the balance on the card account by communicating with one or more payment networks. Further, validating the payee identification information may include authenticating payee identity with the card account issuer. Additionally, the intermediate entity server generates a shadow ledger account for the payee based on the validation as well as payee card account information and payee information, as shown in block 208.

In addition, the enrollment stage 201 may include the card issuer offering a feature on a card account to a payee such that the payee card account can be used as a merchant account, as shown in block 207*a*. That is, the payee card account can be used to accept customer payments including credit card, debit card, prepaid card, or ACH payments and the like. The card issuer may offer this feature to the payee when issuing a new card account to the payee. Alternatively, the card issuer may offer such a feature to the payee on an existing payee card account. Further, the payee may agree to enable this feature on the payee card account, as shown in block 209*a*. The agreement may include terms and conditions for using the feature as well as payment rules for the way in which to remit funds from customer card payments to the payee card account.

Referring to FIG. 2A, the example methods include a payment request stage 203. The method 203 includes the payee providing instructions to send a payment request to a payor from a payee computing device, as shown in block 212. Further, the intermediate entity server receives instructions from a payee to initiate a payment request to a payor, as shown in block 214. In addition, the method includes the intermediate entity server sending a payment request to the payor, as shown in block 216. Moreover, the payor computing device 255 receives the payment request from the intermediate entity server 253, as shown in block 218, such that the payment request can be accessed and viewed by the payor on a payor computing device. The payment request may include an electronic invoice, bill, or statement, or any combination thereof.

FIG. 2B is an exemplary flowchart of an example method for accepting payor card payments and processing and crediting the card payments to a payee card account. Such an example method may be called the payment stage 209. Such an example method 209 include the payor, through a computing device, rendering a (card) payment that includes sending payment information from a payor to an intermediate entity server, as shown in block 220 and accepting the payor (card) payment by receiving payment information from a payor at an intermediate entity server, as shown in block 222. Further, the intermediate entity server authorizes the payment transaction, based on the payment amount and the payor account information, as shown in block 230. Authorizing of the payment transaction includes using one or more payment networks to verify with the payor card issuer that the payor card account has sufficient funds to process payment for the payment amount. The one or more payment networks include Visa, MasterCard, Discover, American Express, Maestro, STAR and the like. Moreover, the example method 209 includes providing instructions to the payor card issuer, by the intermediate entity 253, to debit a payor account based on the payor account information, as shown in block 226, and credit a shadow ledger account based on the payee card account identification information, as shown in block 232. In such an embodiment the intermediate entity interacts with the issuer of the payee card account systems to credit the card account according to the customer card payments accepted by the intermediate entity on the payee's behalf. Also, the intermediate entity server processes the payment transaction based on one or more payee payment rules, arranged a priori, that may include maintaining a certain balance for the shadow ledger account and retaining a certain percentage of each payment by the intermediate entity, remitting payment after the card account cycle is closed and the like as well as rules and preferences imposed by the card issuer, the payee, or one or more payment networks, as shown in block 234. A table of payee payment rules may be stored on one or more storage devices on the intermediate entity server. Further, the method 209 includes providing instructions, by the intermediate entity server, to debit the shadow ledger account and to credit the payee card account based on the payee card account identification information, as shown in block 228.

In another embodiment, the payee may send the intermediate entity server instructions (electronically, mail, telephone, etc.) to transfer funds from shadow account to the his card account at the issuer. That is, the payee provides instructions to the intermediate entity server to debit the shadow ledger and credit the payee card account by the instructed payment amount.

Referring to FIG. 2C, the example methods include a payment information request stage 213. The example methods includes sending a payment information request by a payee through a payee computing device, as shown in block 236. Further the intermediate entity server receives a request for payment information from the payee for one or more payment transactions, as shown in block 238. The request for payment information can include name of the payor, payor card type, payment date, payment amount, order information, invoice information, and payment reference information or any combination thereof. In addition, in response to the request, the intermediate entity server provides, and the payee receives, payment information for the one or more payment transactions associated with the payor in the request, as shown in blocks 240 and 242, respectively. The capability to request payment information relating to one or more payors allows the payee to track payments of the payor(s) to monitor cash flow, billing history, etc.

Referring to FIG. 2C, the example methods include a payment refund stage 215. The example method 215 include a payee sending through a payee computing device and the intermediate entity server 253 receiving a request to refund a payment from the payee for a payment transaction, as shown in blocks 244 and 246, respectively. In response to the request to refund, the intermediate entity server 253 provides instructions to debit the payee card account and credit the payor account, as shown in blocks 248, 250, and 252 respectively. In some embodiments, the payee card account may not need debited if the payee shadow ledger account maintained by the intermediate entity server has sufficient funds to render the refund. In such an embodiment, the intermediate entity server may debit the shadow ledger account according to the payment refund.

Figure 3:
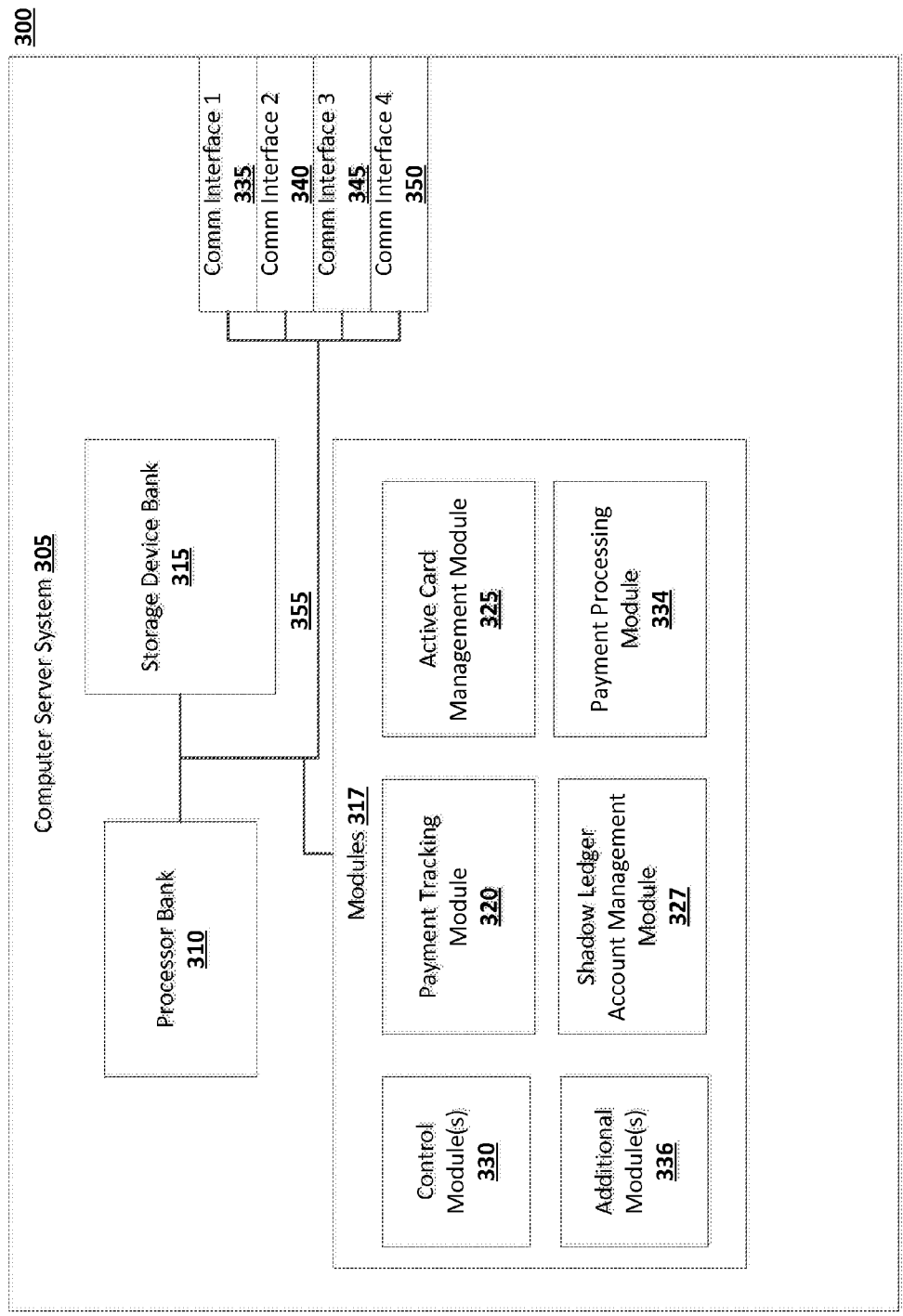
FIG. 3 is an exemplary computer server system for accepting payor card payments and processing and crediting the card payments to a payee card account.

FIG. 3 is an exemplary computer server system 300 for accepting payor card payments and processing and crediting the card payments to a payee card account. The computer server system 305 is operated by an intermediate entity. As described in the present disclosure, the intermediate entity allows a payee such as a business to use a card account (e.g. credit card, debit card account, prepaid account, etc.,) as a merchant account to accept card payments (e.g. credit or debit card) from a payor or customer.

Thus, to implement embodiments for accepting and processing payor card payments to credit payee card account, the computer server system 305 may include one or more computer servers coupled in a distributed system or may be one computer server, each having several different components such as a processor bank 310, storage device bank 315, one or more modules 317 implemented by the processor bank 310, and one or more communication interfaces (335-350). The processor bank 310 may include one or more processors that may be co-located with each other or may be located in different parts of the computer server system 305. The storage device bank 315 may include one or more storage devices. Types of storage devices may include memory devices, electronic memory, optical memory, and removable storage media. The one or more modules 317 may include a payment tracking module 320, an active card management module 325, a shadow ledger account management module 327, a payment authentication module 334, one or more control modules 330 and one or more additional modules 336. The control modules 330 and additional modules may implement software and/or hardware functions that assist in performing certain tasks for the computer server system 305 such as providing access to a communication network, executing an operating system, managing software drivers for peripheral components, and processing information. The additional modules 336 may also include software drivers for peripheral components, user interface computer programs, debugging and troubleshooting software tools.

The computer server system 305 allows a payee to enrolling in a system for the payee to use a card account (existing card account or recently issued card account) as a merchant account to accept a card or ACH payment from a payor. In one embodiment a payee accesses a website associated with the intermediate entity and enrolls in the card payment processing system. An issuer may have such a feature available for certain cards. Thus, during enrollment, the payee and the issuer agree on certain terms and conditions including payment rules such that the payee card account may be used as merchant account to accept payor card payments. The payee provides card account information using a payee computing device for a payee card account to accept payment by the computer server system 305 as well as payee identification information. The payee card account information includes a payee card number or a subset thereof, payee card expiration date, payee card security code, or any combination thereof. The payee identification information includes payee name, payee address, payee telephone number, payee email address, alias for an account, internal account reference, or any combination thereof.

In an alternative embodiment, the payee may enable this feature to use the payee card account to accept customer payments when applying for a new payee card account or enable such a feature to an existing payee card account. Further embodiments may have a card issuer or merchant processor to enroll or enable the feature of using a payee card account to accept payor (card) payments. In such an embodiment the card issuer may send to the computer server system 305 payee card account information that has been a validated and enabled to be used to accept payor (card) payments. The shadow ledger account management module 327 may then generates a payee shadow ledger account that is coupled to the payee card account.

In one embodiment, the computer server system 305 receives the payee card information and payee identification information over one or more communication interfaces (335-350) from the payee computing device or a card issuer computer server over a communication network. Such information may be processed and stored by the active card management module 325 into the storage device bank 315 using one or more databases. Moreover, the computer server system 305 may use the shadow ledger account management module to validate the payee card account information and the payee identification information. Such validation may include the active card management module 325 sending the payee card information and the payee information to the payee card issuer through a payment network over one of the communication interfaces (335-350). Verifying the card account information with a card issuer through the payment network includes determining whether the payee card account is eligible to be used as a merchant account to accept customer card payments. When the payee card account is validated and the payee identity is authenticated, the shadow ledger account management module 327 generates a payee shadow ledger account.

Further embodiments include a payee providing instructions to the computer server system 305 to send a payment request to a payor. Further, computer server system 305 receives instructions from a payee to initiate a payment request to a payor. The payment tracking module 320 processes and sends the payment request to the payor computing device over one or the communication interfaces (335-350). The payment request may include an electronic invoice, bill, or statement, or any combination thereof and is stored in a database in the storage device bank 315 for later access. Further, the payor may access the payment request using the payor computing device.

In an additional embodiment, the payor, through a computing device, sends payment information to render a payment and the computer server system 305 accepts such payor payment by receiving such payment information across a communication network coupled to both the payor computing device and one of the communication interfaces (335-350). The payment may be rendered using a card (e.g. credit card, debit card, prepaid, card, etc.) or an electronic check or ACH payment and the like The payment information may include the payment amount, payor card account information, and payee card account identification information or a subset thereof. The payee card account identification information may further include a payee name, payee address, payee telephone number, payee email address, password, personal identification number (PIN). The payment information may include payment amount, payor account information, a subset of a payor card number, payor card expiration date, payor card security code, payment network pin value, and payor identification information or a combination thereof.

In addition, the computer server system using the payment processing module 334 authorizes the payment transaction, based on the payment amount and the payor card account information. Authorizing of the payment transaction includes sending the payment amount and the payor card account information to a payor card issuing financial institution over one or more payment networks. Payment processing module 334 receives payment authorization from the payment networks. The one or payment networks include Visa, MasterCard, Discover, American Express, STAR, Pulse, and alike. Once the verification is received, the shadow ledger account management module 327 in conjunction with the payment tracking module 320 provides instructions to debit a payor account based on the payor account information and credit a payee shadow ledger account.

The computer server system 305 also processes the payment transaction based on one or more payee payment rules using the payment processing module 334 in conjunction with the shadow ledger account management module 327. Payment rules are configured upon the payee enrolling/enabling in the intermediate entity's card processing payment system or upon the payee enabling the feature of accepting customer card payments using a payee card account with the card issuer. Rules imposed by the card issuer payment network, intermediate entity or preferences by the payee (cardholder). Such payment rules may include maintaining a certain balance for the payee shadow ledger account and for the intermediate entity retaining a certain percentage of each payment as well scheduling the remit of funds from the shadow ledger account to the payee card account and when a cardholder statement becomes available and the like. Each payee in the card processing payment system may have a different set of payment rules and are stored in a database in the storage device bank 315. Moreover, the computer server system 305 provides instructions using the payment tracking module 320 and the shadow ledger account management module 327 to debit the payee shadow ledger account and to credit the payee account.

In another embodiment, the payee may request payment information from the computer server system 305. The payee sends a payment information request using a payee computing device and the computer server system 305 receives the request for payment information for one or more payment transactions through the one or more communication interfaces (335-350). The request for payment information can include name of the payor, payor card type, payment date, payment amount, order information, invoice information, and payment reference information. In addition, in response to the request, the computer server system 305 using the payment tracking module 320 accesses the payment information from the database stored in the storage device bank 315. Further, the payment tracking module 320 sends the requested payment information to the payee across the one or more communication interfaces (335-350).

In an additional embodiment, the payee may request the intermediate entity to refund a payment made by a payor. The payee sends and the computer server system 305 receives a request to refund a payment for a payment transaction. In response to the request to refund, the shadow ledger account management module 327 and the payment tracking module 320 providing instructions to debit the payee card account and credit the payor account. In some embodiments, the payee card account may not need debited if the payee shadow ledger account maintained by the intermediate entity server 253 has sufficient funds to render the refund. In such an embodiment, the intermediate entity server 253 may debit the ledger account according to the payment refund.

Each of the communication interfaces (335-350) shown in FIG. 3 may be software or hardware associated in communicating to other devices. The communication interfaces (335-350) may be of different types that include a user interface, USB, Ethernet, WiFi, WiMax, wireless, optical, cellular, or any other communication interface coupled to communication network.

An intra-device communication link 355 between the processor bank 310, storage device bank 315, modules 317, and communication interfaces (335-350) may be one of several types that include a bus or other communication mechanism.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of configuring a computer server, the method comprising:
    receiving one or more messages including payee card account information from an issuer module at the computer server, wherein the computer server is an intermediate server linking an issuer module and one or more payment networks;
    in response to receiving the one or more messages, activating the computer server to enable a payee card account to accept payment from a payor, the payee card account being used to make purchases on behalf of a payee;
    in response to receiving the one or more messages, triggering the computer server to generate a shadow ledger account and link the shadow ledger account to the payee card account on the issuer module, wherein payments received at the computer server from a payor are stored in the shadow account ledger;
    receiving payor payments at the computer server and storing the payor payments in the shadow account ledger; and
    based on rules set up at the computer server a priori, directly transmitting at least a portion of the payor payment from the shadow ledger account to the payee card account on the issuer module via a settlement process between the computer server and one or more other devices.

2. The method of claim 1 further comprising electronically debiting a payor account an amount of the payor payment and electronically crediting the shadow ledger account the amount of the payor payment, wherein debiting of the payor account occurs a period of time prior to crediting of the shadow ledger account.

3. The method of claim 1, further comprising electronically debiting the shadow ledger account and crediting the payee card account when the shadow ledger account reaches a predetermined balance.

4. The method of claim 1, wherein a transaction processing fee is retained at the computer server.

5. The method of claim 1, wherein the payee card account is selected from the group consisting of a credit card account, a debit card account, pre-paid card, stored value card, stored value account, a charge account, a purchasing card account, a corporate card account, and a combination thereof.

6. The method of claim 1, wherein the payee card account is held by an entity that is selected from group consisting of a corporate account cardholder, a consumer account cardholder, purchasing account cardholder, business account cardholder, government account cardholder and a combination thereof.

7. The method of claim 1, further comprising:
    receiving instructions that include an input amount at the computer server from a computing device to transfer the input amount from the shadow ledger account to the payee card account; and
    transferring the input amount.

8. The method of claim 1, further comprising:
    receiving instructions, at the computer server, from a computing device, the instructions including a request to transfer funds from the shadow ledger account to an external account; and
    debiting the shadow ledger account and crediting the external account.

9. The method of claim 8, wherein the external account is selected from the group consisting of a bank account, a credit card account, a prepaid card account, a debit card account and a combination thereof.

10. The method of claim 1, wherein the payment is selected from the group consisting of a credit card transaction, debit card transaction, prepaid card transaction, stored value card transaction, electronic check transaction, Automated Clearing House (ACH) transaction, electronic payment transaction, and any combination thereof.

11. The method of claim 1, wherein the payor payment information is selected from the group consisting of a payment amount, payor account information, a payor card number, payor card expiration date, payor card security code, payor address, payor name, payor identification information, bank account number, bank routing information and a combination thereof.

12. The method of claim 11, wherein payor account information is selected from a group consisting of alias, name, address, telephone number, email address, account number, account information, identification information, payment amount and a combination thereof.

13. The method of claim 1, wherein the authorizing the payor payment includes using one or more payment networks to process the payment.

14. The method of claim 13 wherein the one or more payment networks are selected from the group consisting of a credit card network, debit card network, a proprietary payment network an electronic fund transfer (EFT) network, ATM network, electronic check processing network, and an Automated Clearing House network and a combination thereof.

15. The method of claim 1, further comprising:
    receiving instructions at the computer server to initiate a payment request; and
    sending the payment request to the payor by the computer server;
    wherein the payment request includes at least one of an electronic invoice, bill, statement, amount due, and date due.

16. The method of claim 1, further comprising:
    receiving a request for a previously stored payor payment information for one or more payor payments at the computer server; and
    in response to the request, providing the previously stored payor payment information for the one or more payor payments by the computer server.

17. The method of claim 16, wherein previously stored payor payment information is selected from the group consisting of name of the payor, payor card type, a card number, a subset of card number, a payment date, a payment amount, order information, invoice information, payment reference information, and a combination thereof.

18. The method of claim 1, further comprising:
    receiving a request to refund a payment for a payor payment at the computer server; and
    in response to the request for refund, by computer server, crediting the payor account.

19. The method of claim 1, wherein the payor renders payment using a payment acceptance mechanism selected from the group consisting of a website operated by an intermediate entity server, a website operated by the cardholder, a mobile application, a text message, an interactive voice response (IVR) system, a point-of-sale (POS) terminal, a mobile point-of-sale (POS) terminal and a combination thereof.

20. The method of claim 1 further comprising debiting the shadow ledger account an amount of the payor payment.

21. The method of claim 20 further comprising crediting the payee card account the amount of the payor payment based on payment rules.

22. The method of claim 21, wherein debiting of the shadow ledger account occurs a period of time prior to crediting of the card account.

23. The method of claim 21, wherein the payment rules are selected from the group consisting of remitting payment when a credit card bill becomes available, after a card account billing cycle is closed, at a predetermined number of days before a credit card bill is due, when a credit card bill is due, rules imposed by the card issuer, rules imposed by one or more payment networks, rules imposed by an intermediate entity, preferences, rules imposed by a processor, and any combination thereof.

24. The method of claim 1, wherein authorizing the payor payment includes submitting the payor payment to an ACH network for processing.

25. The method of claim 1 further comprising: providing instructions, by the computer server, to debit the shadow ledger account and to credit the payee card account.

26. A system comprising:
an intermediate computer server linking an issuer module and one or more payment networks, the intermediate computer server including:
one or more processors;
one or more storage devices coupled to the one or more processors;
one or more modules, implemented by the one or more processors, the one or modules:
receiving one or more messages including payee card account information from an issuer module;
in response to receiving the one or more messages, activating the computer server to enable a payee card account to accept payment from a payor, the payee card account being used to make purchases on behalf of a payee;
in response to receiving the one or more messages, triggering the computer server to generate a shadow ledger account on the computer server and link the shadow ledger account on the computer server to the payee card account on the issuer modules;
receiving, over one or more communication networks, payor payment information;
storing the payor payments in the shadow account ledger; and
based on rules set up at the computer server a priori, directly transmitting at least a portion of the payor payment from the shadow ledger account to the payee card account via a settlement process with an issuer module between the computer server and one or more other devices.

27. The system of claim 26 wherein the one or modules debit the shadow ledger account the amount of the payor payment.

28. The system of claim 27 wherein the one or modules credit the payee card account the amount of the payor payment based on payment rules.

29. A method of configuring a computer server, the method comprising:
receiving one or more messages including payee card account information from an issuer module at the computer server;
in response to receiving the one or more messages, activating the computer server to enable a payee card account to accept payment from a payor, the payee card account being used to make purchases on behalf of the payee, wherein activating the computer server reconfigures the computer server processes in order to allow the computer server to accept the payment from a payment network on the computer server and directly transmit that payment from a shadow account ledger on the computer server to the issuer module;
storing the payee card account information in a secured database by the computer server;
receiving payor payment information at the computer server from a payment network;
storing the payor payment information in the secured database;
receiving instructions at the computer server to debit a payor card account an amount of the payor payment;
based on rules configured at the computer server a priori, directly transmitting, by the computer server, at least a portion the payor payment to one or more issuer modules depending on the rules.

30. A method of configuring a computer server, the method comprising:
receiving one or more messages including payee card account information from an issuer module at the computer server, wherein the computer server is an intermediate server linking one or more issuer modules and one or more payment networks;
in response to receiving the one or more messages, activating the computer server enable a payee card account to accept payment from a payor, the payee card account being used to make purchases on behalf of the payee by:
storing the payee card account information in a secured database by the computer server;
triggering the computer server to generate a shadow ledger account on the computer server;
linking the shadow ledger account on the computer server to the payee card account on the issuer module;
receiving payor payment information at the computer server;
authorizing payor payment based on the payor payment information;
storing the payor payment information in the secured database by the computer server;
receiving instructions at the computer server, to debit a payor card account; and
based on rules configured at the computer server a priori, directly transmitting, by the computer server, at least a portion of the payor payment to one or more issuer modules depending on the rules.

31. The method of claim 30 further comprising:
debiting, by the computer server, the shadow ledger account, and crediting, by the computer server, the shadow ledger account based on card account payment information.

* * * * *